(12) United States Patent
Terasawa et al.

(10) Patent No.: US 7,854,988 B2
(45) Date of Patent: Dec. 21, 2010

(54) LIGNOCELLULOSE-BASED MOLDED PRODUCT AND PROCESS OF MAKING SAME

(75) Inventors: Isamu Terasawa, Toyota (JP); Kazunori Tsuneoka, Obu (JP); Junichi Noguchi, Okazaki (JP); Yasuto Kondo, Toyokawa (JP); Takuya Murashita, Toyokawa (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 269 days.

(21) Appl. No.: 12/073,323

(22) Filed: Mar. 4, 2008

(65) Prior Publication Data
US 2008/0241498 A1    Oct. 2, 2008

(30) Foreign Application Priority Data
Mar. 29, 2007   (JP) ............................. 2007-087619

(51) Int. Cl.
*B32B 21/02*   (2006.01)

(52) U.S. Cl. .................................... 428/292.4; 428/326
(58) Field of Classification Search ............. 428/292.4, 428/35.2
See application file for complete search history.

(56) References Cited

U.S. PATENT DOCUMENTS

| | | | |
|---|---|---|---|
| 3,417,175 A * | 12/1968 | Brown et al. ................. | 264/220 |
| 3,508,871 A * | 4/1970 | Cory ......................... | 423/447.8 |
| 4,357,194 A * | 11/1982 | Stofko ....................... | 156/308.6 |

FOREIGN PATENT DOCUMENTS

| | | |
|---|---|---|
| CN | 1030377 A | 1/1989 |
| CN | 1410237 A | 4/2003 |
| JP | 2003-165844 A | 6/2003 |

* cited by examiner

*Primary Examiner*—N. Edwards
(74) *Attorney, Agent, or Firm*—Birch, Stewart, Kolasch & Birch, LLP

(57) ABSTRACT

A lignocellulose-based molded product is made by mixing furan resin with steam-treated lignocellulose-based material, and molding the resulting mixture by applying heat and pressure.

7 Claims, 2 Drawing Sheets

LIGNOCELLULOSE-BASED MOLDED PRODUCT AND PROCESS OF MAKING SAME

BACKGROUND OF THE INVENTION

1. Field of the Invention

This invention relates to a lignocellulose-based molded product and a process of making the same.

2. Description of the Related Art

Conventionally, for automotive molded resin components and the like, oil-derived thermoplastic and thermosetting resins are used. For example, automotive ash trays are molded from phenolic resin or the like mixed with wood chips, fibers or the like.

Products molded from oil-derived materials such as phenolic resin, however, increases the Earth's carbon dioxide when burned. In addition, phenolic resin or the like contains free phenol and formaldehyde, and therefore may produce substances harming the human body.

Thus, a technology has been developed, according to which molded products similar to thermosetting resin products are obtained by subjecting plant-derived lignocellulose-based material to steam treatment, drying and pulverization, successively, and then molding it by applying heat and pressure (see Japanese Unexamined Patent Publication No. 2003-165844, for example).

The products molded only from lignocellulose-based material are, however, inferior in water non-absorbing property and low in moisture resistance, and therefore not suitable as automotive molded resin components since they undergo deformation such as expansion when used as automotive products.

Further, lignocellulose-based material has a problem that it does not allow molding into complicated shapes, since heat applied to lignocellulose-based material in powder form changes only a small part of it into fluid form.

Also with the products molded from lignocellulose-based material mixed with another common thermoplastic, thermosetting or biodegradable resin, there are problems such that common thermoplastic and thermosetting resins are derived from oil, and that thermoplastic and biodegradable resins do not react with lignocellulose-based material, which accounts for the mixed material's inferior mechanical property and the molded products' inferior durability.

SUMMARY OF THE INVENTION

This invention has been made to solve the problems as mentioned above. The primary object of the invention is to provide a lignocellulose-based molded product which is improved in water non-absorbing property and moisture resistance, puts less burdens on the environment and the human body, and is allowed to have a complicated shape, and a process of making the same.

In order to achieve the above object, a lignocellulose-based molded product according to the present invention is characterized by being molded from steam-treated lignocellulose-based material mixed with furan resin.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
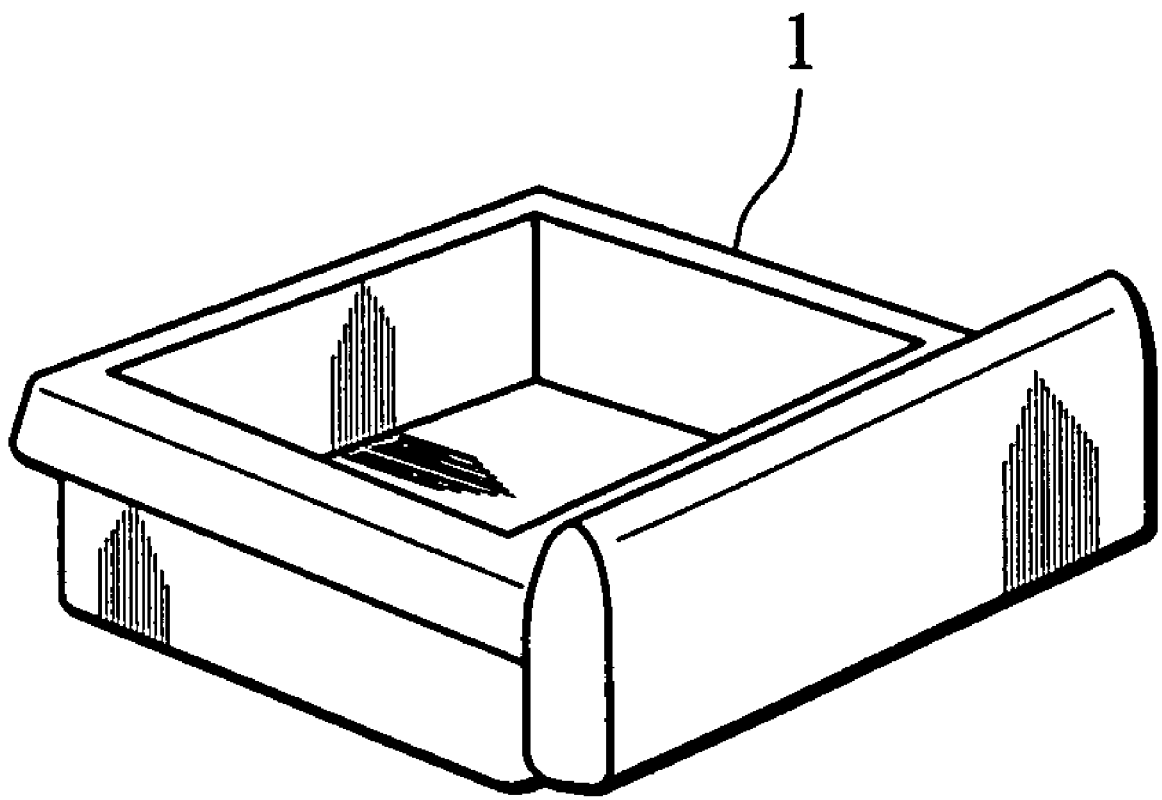
FIG. 1 is a perspective view of an example of a lignocellulose-based molded product according to the present invention.

FIG. 1 shows a perspective view of an example of a lignocellulose-based molded product according to the present invention.

The lignocellulose-based molded product 1 shown in FIG. 1 is an automotive molded resin component (ash tray), which is molded by applying heat and pressure to lignocellulose-based material mixed with furan resin.

Specifically, plant-derived, namely tree- or grass-derived lignocellulose-based material, such as wood, bamboo, kenaf or the like, is subjected to so-called steam treatment. Specifically, the lignocellulose-based material is steam-boiled in a pressure-resistant container with high-temperature high-pressure steam. After the steam boiling, the lignocellulose-based material may be subjected to blasting by quick discharge into atmospheric pressure. Such steam treatment decomposes some of hemicelluose and lignin constituting the lignocellulose-based material, thereby producing thermoplastic constituents, and also makes the wood or vegetable fibers easier to loosen. It is to be noted that when steam-treated, the lignocellulose-based material also produces an acid substance such as acetic acid or aldehyde. Thus, as a neutralizing agent, an alkaline substance such as calcium oxide may be added to the lignocellulose-based material.

The steam treatment performed at high temperature and high pressure kills insects, molds, bacteria and the like contained in the lignocellulose-based material, and therefore leads to an improvement in rot resistance and durability.

The steam-treated lignocellulose-based material is dried and then pulverized for use in fine powder form.

On the other hand, furan resin is a natural thermosetting resin obtained by subjecting corncobs or the like to carbonization. Furan resin consisting of furan and furfural alcohol and being in liquid form at normal temperature is used.

When the hardening time for the furan resin needs to be in agreement with that for the above-described lignocellulose-based material, a hardening agent is added to the furan resin. As a hardening agent, for example, an acid such as para-toluene sulfonate, acetic acid or formic acid is used.

The lignocellulose-based material and the furan resin are mixed manually in a mortar, or by means of a mixer using shearing force, such as a biaxial extruder or a kneader. When the lignocellulose-based molded product 1 should have fire-retardancy, a fire-retarding agent, such as a halogen-based, particularly bromine-based fire-retarding agent, a phosphorus-based fire-retarding agent, aluminum hydroxide, magnesium hydroxide or the like, is added to the mixture.

The mixture of the lignocellulose-based material and the furan resin is put in a mold and subjected to hot pressing by a hot pressing machine, so that the lignocellulose-based molded product 1 is obtained.

Here, the molding by a hot pressing machine can be replaced with injection molding by an injection molding machine. The injection molding by an injection molding machine allows the lignocellulose-based mixture to be easily molded into a three-dimensional shape.

Next, a specific example of a process of making a lignocellulose-based molded product according to the present invention will be described.

Figure 2:
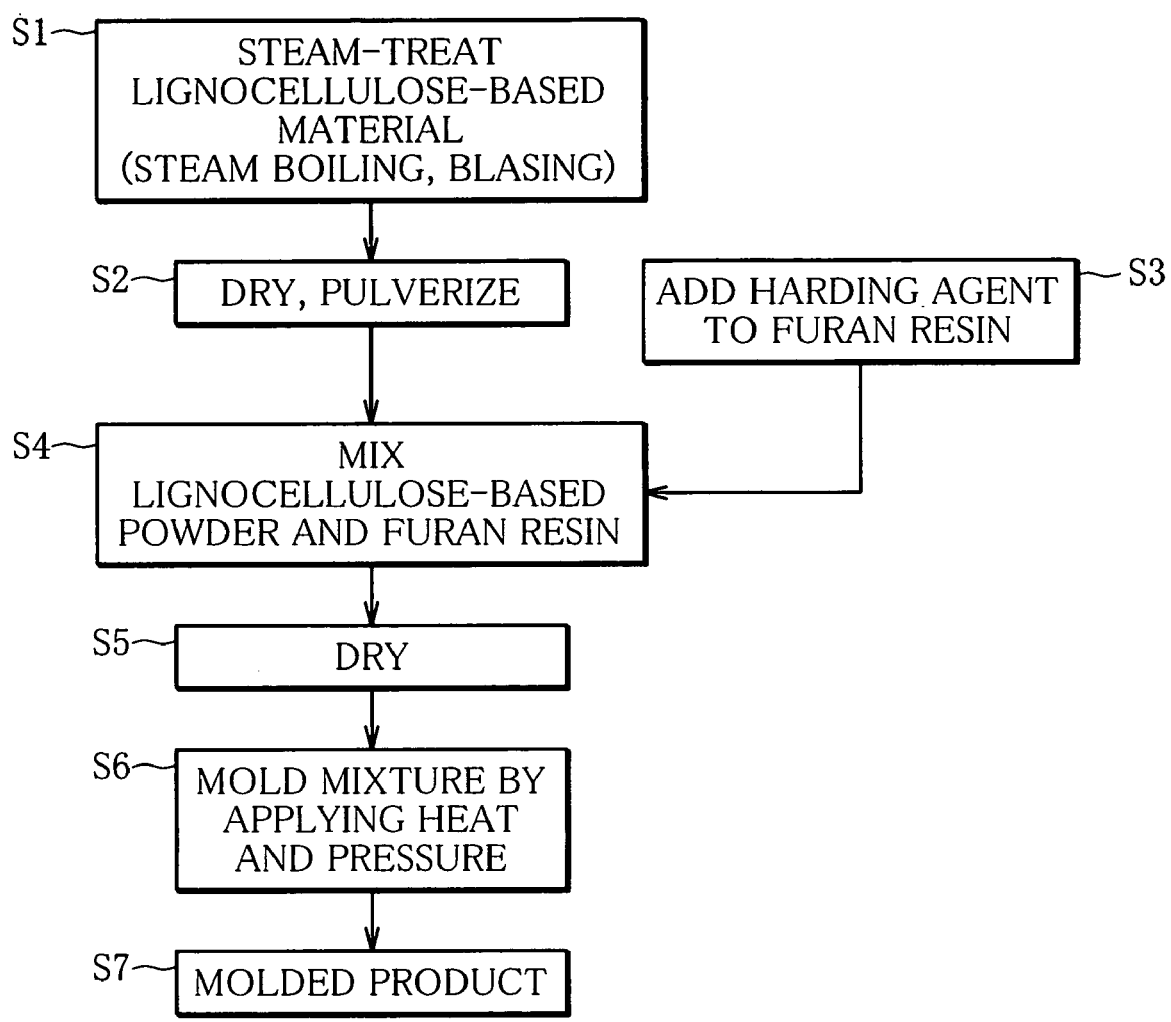
FIG. 2 is a process chart showing an example of a process of making a lignocellulose-based molded product according to the present invention.

FIG. 2 is a process chart showing an example of a process of making a lignocellulose-based molded product according to the present invention.

First, at Step S1, lignocellulose-based material such as wood, bamboo, kenaf, hemp or another tree- or grass-derived material is subjected to steam treatment.

At succeeding Step S2, the steam-treated lignocellulose-based material is dried and then pulverized.

Meanwhile, at Step S3, a hardening agent is added to furan resin.

Then, at Step S4, the pulverized lignocellulose-based material and the furan resin are mixed, for example by means of a biaxial extruder.

At succeeding Step S5, the mixture of the lignocellulose-based material and the furan resin is put on a dryer set to a drying temperature of 70 to 120° C. so as to be dried to a moisture content 2%.

Then at Step S6, the mixture is put in a mold heated to 160 to 220° C., to which pressure of 80 to 600 kgf/cm$^2$ (7.8 to 56.8 MPa) is applied for 30 to 300 seconds in a hot pressing machine. The temperature of the mold, the pressure applied, the pressure maintaining time, etc. are adjusted depending on the type of the lignocellulose-based material, the proportion of the furan resin in the mixture, etc.

Then at Step S7, the mold is cooled to 120° C. or lower, and the molded product is removed.

As mentioned above, the steam treatment on the lignocellulose-based material decomposes hemicelluose and lignin, thereby producing thermoplastic constituents. Further, the furan resin, which is a natural thermosetting resin, mixed with the lignocellulose-based material results in an increase in crosslink density.

Further, since the furan resin is a natural material, the burning or the like of it does not lead to an increase in carbon dioxide, and the use of it can reduce burdens on the human body.

Thus, the resulting lignocellulose-based molded product is improved in water non-absorbing property and moisture resistance and puts less burdens on the environment and the human body.

Although in the above-described process, a hardening agent is added to furan resin in advance at Step S3, the hardening agent can be mixed with the lignocellulose-based material and furan resin at Step S4. Alternatively, the molding can be carried out without adding the hardening agent.

Further, the molding at Steps S6 and S7 can be injection molding.

EXAMPLES

Examples 1 to 3

Furan resin ("Hitafuran" made by Hitachi Chemical Co., Ltd.) was mixed with steam-treated maple wood powder, where the proportion of the furan resin was 9 wt % (weight percent) in example 1, 18 wt % in example 2 and 27 wt % in example 3. It is to be noted that, as a hardening agent, para-toluene sulfonate ("Hitafuran hardener A3" made by Hitachi Chemical Co., Ltd., for example) diluted with 9 times as much water was added to the furan resin, where the proportion of para-toluene sulfonate relative to the furan resin was about 10 wt %, and therefore, the proportion of the hardening agent relative to the entire weight of the molded product was 0.1 wt % in example 1, 0.2 wt % in example 2 and 0.3 wt % in example 3.

The maple wood powder and the furan resin with the hardening agent added were mixed manually in a mortar. The resulting mixture was put in a mold heated to 200° C., and subjected to hot pressing by a hot pressing machine, where pressure of 122 kgf/cm$^2$ (12.0 MPa) was applied for 2 minutes.

Comparative Example 1

Only steam-treated maple wood powder was put in a mold heated to 200° C., and subjected to hot pressing by a hot pressing machine, where pressure of 122 kgf/cm$^2$ (12.0 MPa) was applied for 2 minutes.

Comparative Examples 2, 3

Furan resin ("Hitafuran" made by Hitachi Chemical Co., Ltd.) was mixed with steam-treated maple wood powder, where the proportion of the furan resin was 3 wt % (weight percent) in comparative example 2 and 45 wt % in comparative example 3. It is to be noted that, as a hardening agent, para-toluene sulfonate ("Hitafuran hardener A3" made by Hitachi Chemical Co., Ltd.) diluted with 9 times as much water was added to the furan resin, where the proportion of para-toluene sulfonate relative to the furan resin was about 10 wt %, and therefore, the proportion of the hardening agent relative to the entire weight of the molded product was 0.04 wt % in comparative example 2 and 0.5 wt % in comparative example 3.

The maple wood powder and the furan resin with the hardening agent added were mixed manually in a mortar. The resulting mixture was put in a mold heated to 200° C., and subjected to hot pressing by a hot pressing machine, where pressure of 122 kgf/cm$^2$ (12.0 MPa) was applied for 2 minutes.

The molded products obtained in examples 1 to 3 and comparative examples 1 and 2 (molding failed in comparative example 3, which will be mentioned later) were soaked in water, and the percentage of water absorption was measured after 24 hours, after 48 hours, and after 72 hours. The results are shown in Table 1. It is to be noted that the percentage of water absorption is the percentage of increase in weight of the molded product after specified hours, relative to the weight before being soaked in water.

TABLE 1

|  | Furan resin | After 24 h | After 48 h | After 72 h |
| --- | --- | --- | --- | --- |
| Ex. 1 | 9 wt % | 0.99% | 1.56% | 2.27% |
| Ex. 2 | 18 wt % | 0.62% | 0.87% | 1.24% |
| Ex. 3 | 27 wt % | 0.54% | 0.94% | 1.34% |
| Comp. ex. 1 | Not mixed | 1.28% | 2.18% | 2.57% |
| Comp. ex. 2 | 3 wt % | 1.24% | 2.24% | 2.60% |
| Comp. ex. 3 | 45 wt % | Failed to be molded | Failed to be molded | Failed to be molded |

As seen in Table 1, in examples 1 to 3 in which furan resin was mixed, the percentage of water absorption is, in any stage, much lower compared with comparative examples 1 and 2. This shows that the mixing of furan resin leads to an improvement in water non-absorbing property and moisture resistance. Particularly in examples 2 and 3 in which furan resin was mixed in the proportions of 18 wt % and 27 wt %, respectively, the percentage of water absorption was decreased to less than one half, relative to comparative example 1 in which furan resin was not added. This shows that the proportion of furan resin between 18 wt % and 27 wt % is desirable.

As comparative example 2 shows, furan resin mixed in the proportion of less than 3 wt % does not have a remarkable effect. On the other hand, as comparative example 3 shows, furan resin mixed in the proportion of 45 wt % or greater is excessive and results in excessive fluidity of the mixture, so that the mixture flows out through the gap in the mold and fails to be molded. This shows that the proportion of furan resin between 3 wt % and 45 wt % is appropriate.

Example 4

Steam-treated maple wood powder and 11 wt % of furan resin ("Hitafuran" made by Hitachi Chemical Co., Ltd.) without a hardening agent added were mixed by means of a biaxial extruder. The resulting mixture was put in a mold heated to 200° C., and subjected to hot pressing by a hot pressing machine, where pressure of 295 kgf/cm$^2$ (28.9 MPa) was applied for 2 minutes.

Comparative Example 4

Steam-treated maple wood powder and 20 wt % of furan resin ("Hitafuran" made by Hitachi Chemical Co., Ltd.) without a hardening agent added were mixed manually in a mortar. The resulting mixture was put in a mold heated to 200° C., and subjected to hot pressing by a hot pressing machine, where pressure of 295 kgf/cm$^2$ (28.9 MPa) was applied for 2 minutes.

The molded products obtained in example 4 and comparative example 4 were boiled for 2 hours, and then the percentage of water absorption was measured. The results are shown in Table 3.

TABLE 2

|  | Furan resin | Mixing means | After 2 h of boiling |
| --- | --- | --- | --- |
| Ex. 4 | 11 wt % | Biaxial extruder | 2.31% |
| Comp. ex. 4 | 20 wt % | Mortar | 4.03% |

As seen in Table 2, in spite of a lower proportion of furan resin, the mixture prepared by using a biaxial extruder in example 4 resulted in a lower percentage of water absorption, compared with comparative example 4. This shows that sufficient mixing of the lignocellulose-based material and furan resin by means of a mixer using shearing force, such as a biaxial extruder, leads to an improvement in water non-absorbing property and moisture resistance.

Examples 5 to 7

Steam-treated maple wood powder and 19.4 wt % of furan resin ("Hitafuran" made by Hitachi Chemical Co., Ltd.) were mixed. It is to be noted that a hardening agent (para-toluene sulfonate) diluted with 9 times as much water was added to the furan resin, where the proportion of para-toluene sulfonate relative to the furan resin was 3 wt %, or in other words, the proportion of the hardening agent relative to the entire weight of the molded product was 0.06%.

The maple wood powder and the furan resin with the hardening agent added were mixed manually in a mortar. The resulting mixture was put in a mold heated to 185° C. in example 5, 195° C. in example 6, and 200° C. in example 7, and subjected to hot pressing by a hot pressing machine, where pressure of 122 kgf/cm$^2$ (12.0 MPa) was applied for 2 minutes.

The molded products obtained in examples 5 to 7 were soaked in water, and the percentage of water absorption was measured after 24 hours, after 48 hours, and after 72 hours. The results are shown in Table 3.

TABLE 3

|  | Furan resin | Mold temperature | After 24 h | After 48 h | After 72 h |
| --- | --- | --- | --- | --- | --- |
| Ex. 5 | 19.4 wt % | 185° C. | 1.8% | 2.4% | 3.1% |
| Ex. 6 | 19.4 wt % | 195° C. | 1.1% | 1.8% | 2.3% |
| Ex. 7 | 19.4 wt % | 205° C. | 1.1% | 1.3% | 1.9% |

As seen in Table 3, higher mold temperature resulted in lower percentage of water absorption. This shows that molding at higher temperature leads to an improvement in water non-absorbing property and moisture resistance. Particularly, molding at 200° C. or higher can produce a lignocellulose-based molded product with sufficient water non-absorbing property and moisture resistance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lignocellulose-based product molded from steam-treated lignocellulose-based material mixed with from 9 to 27 weight-% furan resin.

2. The lignocellulose-based molded product of claim 1, wherein the lignocellulose-based molded product is formed by molding a mixture which is made by mixing steam-treated lignocellulose-based material and furan resin by means of a mixer using shearing force.

3. The lignocellulose-based molded product of claim 2, wherein the lignocelulose-based molded product is formed by mixing steam-treated lignocellulose-based material and furan resin by means of a mixer using shearing force, and subjecting the mixture of the steam-treated lignocellulose-based material and the furan resin to injection molding by an injection molding machine.

4. The lignocellulose-based molded product of claim 1, comprising a hardening agent.

5. The lignocellulose-based molded product of claim 4, comprising a para-toluene sulfonate hardening agent, an acetic acid hardening agent, or a formic acid hardening agent.

6. The lignocellulose-based molded product of claim 5, comprising from 0.1 to 0.3 weight-% para-toluene sulfonate hardening agent.

7. The process of claim 2, wherein said lignocellulose-based molded product is made without a hardening agent.

* * * * *